(12) United States Patent
Gao et al.

(10) Patent No.: US 12,052,429 B2
(45) Date of Patent: Jul. 30, 2024

(54) VIDEO ENCODING METHOD, VIDEO DECODING METHOD, AND RELATED APPARATUSES

(71) Applicant: Tencent Technology (Shenzhen) Company Limited, Shenzhen (CN)

(72) Inventors: Xinwei Gao, Shenzhen (CN); Weiran Li, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 17/469,721

(22) Filed: Sep. 8, 2021

(65) Prior Publication Data

US 2021/0409737 A1    Dec. 30, 2021

Related U.S. Application Data

(63) Continuation of application No. PCT/CN2020/114163, filed on Sep. 9, 2020.

(30) Foreign Application Priority Data

Sep. 27, 2019   (CN) .................... 201910927104.X

(51) Int. Cl.
*H04N 19/30*   (2014.01)
*H04N 19/176*  (2014.01)
(Continued)

(52) U.S. Cl.
CPC .......... *H04N 19/30* (2014.11); *H04N 19/176* (2014.11); *H04N 19/46* (2014.11); *H04N 19/70* (2014.11)

(58) Field of Classification Search
CPC ...... H04N 19/30; H04N 19/176; H04N 19/46; H04N 19/70
See application file for complete search history.

(56) References Cited

U.S. PATENT DOCUMENTS

2005/0094732 A1    5/2005  Mukherjee
2011/0221780 A1*   9/2011  Inada ................. G09G 5/39
                                                    345/660
(Continued)

FOREIGN PATENT DOCUMENTS

CN    101282479 A    10/2008
CN    103702118 A    4/2014
(Continued)

OTHER PUBLICATIONS

Kim Su Nyeon translation of KR 20110020215 A Aug. 2010 (Year: 2010).*
(Continued)

*Primary Examiner* — Zaihan Jiang
(74) *Attorney, Agent, or Firm* — Morgan, Lewis & Bockius LLP

(57) ABSTRACT

A video decoding method, a video encoding method, and related apparatuses. The method includes: obtaining a current video frame to be decoded, the current video frame being divided into a plurality of regions; determining a corresponding resolution for each region in the plurality of regions, to obtain a plurality of resolutions, the plurality of resolutions including at least two different resolutions; and decoding a video block in each region in the plurality of regions by using a corresponding resolution, the current video frame being divided into a plurality of video blocks. In this application, the technical problem of relatively large
(Continued)

fluctuations in a PSNR caused by encoding and decoding of a video by using the same resolution in the related art is resolved.

13 Claims, 7 Drawing Sheets

(51) Int. Cl.
  *H04N 19/46* (2014.01)
  *H04N 19/70* (2014.01)

(56) References Cited

U.S. PATENT DOCUMENTS

| | | | |
|---|---|---|---|
| 2015/0249839 A1* | 9/2015 | Shimizu | H04N 19/597 375/240.16 |
| 2017/0302719 A1 | 10/2017 | Chen et al. | |
| 2017/0347122 A1* | 11/2017 | Chou | G06T 9/00 |
| 2019/0166391 A1* | 5/2019 | Park | H04N 21/234372 |
| 2019/0200043 A1* | 6/2019 | Egilmez | H04N 19/172 |
| 2019/0200084 A1* | 6/2019 | Gilson | H04N 21/4728 |
| 2020/0107022 A1* | 4/2020 | Ahn | H04N 19/59 |
| 2021/0409729 A1* | 12/2021 | Gao | H04N 19/17 |

FOREIGN PATENT DOCUMENTS

| | | |
|---|---|---|
| CN | 105959700 A | 9/2016 |
| CN | 106550240 A | 3/2017 |
| CN | 109729379 A | 5/2019 |
| CN | 109792562 A | 5/2019 |
| CN | 110519607 A | 11/2019 |
| EP | 0851656 A1 | 7/1998 |
| KR | 20110020215 A * | 8/2010 |
| KR | 20110020215 A * | 8/2010 |
| WO | WO-2019162230 * | 2/2019 |

OTHER PUBLICATIONS

Tencent Technology, WO, PCT/CN2020/114163, Dec. 7, 2020, 5 pgs.
Tencent Technology, IPRP, PCT/CN2020/114163, Mar. 15, 2022, 6 pgs.
Tencent Technology, ISR, PCT/CN2020/114163, Dec. 7, 2020, 3 pgs.

* cited by examiner

VIDEO ENCODING METHOD, VIDEO DECODING METHOD, AND RELATED APPARATUSES

CROSS-REFERENCE TO RELATED APPLICATIONS

This application is a continuation application of PCT Patent Application No. PCT/CN2020/114163, entitled "VIDEO ENCODING METHOD, VIDEO DECODING METHOD, AND RELATED APPARATUS" filed on Sep. 9, 2020, which claims priority to Chinese Patent Application No. 201910927104.X, entitled "VIDEO ENCODING METHOD AND APPARATUS AND VIDEO DECODING METHOD AND APPARATUS" filed with the China National Intellectual Property Administration on Sep. 27, 2019, all of which are incorporated herein by reference in their entirety.

This application is related to U.S. application Ser. No. 17/469,710, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

This application is related to U.S. Application Ser. No. 17/469,716, entitled "VIDEO ENCODING METHOD AND APPARATUS, VIDEO DECODING METHOD AND APPARATUS, ELECTRONIC DEVICE AND READABLE STORAGE MEDIUM" filed on Sep. 8, 2021, which is incorporated by reference in its entirety.

This application is related to U.S. Application Ser. No. 17/469,729, entitled "VIDEO DECODING METHOD AND APPARATUS, VIDEO ENCODING METHOD AND APPARATUS, STORAGE MEDIUM, AND ELECTRONIC DEVICE" filed on Sep. 8, 2021, which is incorporated by reference in its entirety.

FIELD OF THE TECHNOLOGY

This application relates to the field of computers, and in particular, to video decoding and video encoding.

BACKGROUND OF THE DISCLOSURE

In an existing video encoding process, as shown in FIG. 1, if different blocks in a frame in a video are encoded by using a high resolution, when transmission bandwidth is relatively small (for example, less than a bandwidth threshold Th shown in FIG. 1), a corresponding peak signal-to-noise ratio 1 (PSNR 1) when the different blocks in the frame in the video are encoded by using the high resolution is less than a corresponding PSNR 2 when the different blocks in the frame in the video are encoded by using a low resolution. That is, when the transmission bandwidth is relatively small, the PSNR 1 is relatively small when encoding is performed by using the high resolution, and distortion is relatively large.

Similarly, if the different blocks in the frame in the video are encoded by using the low resolution, when the transmission bandwidth is relatively large (for example, greater than the bandwidth threshold Th shown in FIG. 1), a corresponding PSNR 3 when the different blocks in the frame in the video are encoded by using the low resolution is less than a corresponding PSNR 4 when the different blocks in the frame in the video are encoded by using the high resolution. That is, when the transmission bandwidth is relatively large, the PSNR 3 is relatively small when encoding is performed by using the low resolution, and the distortion is relatively large.

In addition, for different types of videos or different frames in the same video or different blocks in the same frame, an intersection D shown in FIG. 1 moves.

SUMMARY

Embodiments of this application provide a video encoding method, a video decoding method, and related apparatuses, to resolve at least the technical problem of relatively large fluctuations in a PSNR caused by encoding and decoding of a video by using the same resolution in the related art.

According to an aspect of the embodiments of this application, a video decoding method is performed by an electronic device, the method including:

obtaining a current video frame to be decoded, the current video frame being divided into a plurality of regions;

determining a corresponding resolution for each region in the plurality of regions, to obtain a plurality of resolutions, the plurality of resolutions including at least two different resolutions; and decoding a video block in each region in the plurality of regions by using a corresponding resolution, the current video frame being divided into a plurality of video blocks.

According to another aspect of the embodiments of this application, a video encoding method is performed by an electronic device, the method including:

obtaining a current video frame to be encoded, the current video frame being divided into a plurality of regions;

determining a corresponding resolution for each region in the plurality of regions, to obtain a plurality of resolutions, the plurality of resolutions including at least two different resolutions; and encoding a video block in each region in the plurality of regions by using a corresponding resolution, the current video frame being divided into a plurality of video blocks.

According to another aspect of the embodiments of this application, an electronic device is provided, including a memory and a processor, the memory storing a computer program, the processor being configured to perform the video decoding method according to the foregoing aspects or perform the video encoding method according to the foregoing aspects by using the computer program.

According to another aspect of the embodiments of this application, a non-transitory computer-readable storage medium is provided, storing computer-readable instructions, the computer-readable instructions being configured to perform the video decoding method according to the foregoing aspects or perform the video encoding method according to the foregoing aspects when being run.

According to another aspect of the embodiments of this application, a computer program product including instructions is provided, the instructions, when run on a computer, causing the computer to perform the video decoding method according to the foregoing aspects or perform the video encoding method according to the foregoing aspects.

In the embodiments of this application, a current video frame is obtained, the current video frame being divided into a plurality of regions; a corresponding resolution is determined for each region in the plurality of regions, to obtain a plurality of resolutions, the plurality of resolutions including at least two different resolutions; and a video block in each region in the plurality of regions is decoded by using a corresponding resolution, the current video frame being divided into a plurality of video blocks. For a video frame in a video, different video blocks in the video frame may be adaptively encoded by using a corresponding resolution. In this way, regardless of whether transmission bandwidth is relatively small or is relatively large, a corresponding PSNR is relatively large, and distortion is relatively small, thereby ensuring that the PSNR can change within a relatively small range, and the PSNR is relatively large, thereby achieving the technical effect of avoiding relatively large fluctuations in the PSNR during encoding and decoding of a video, to resolve the technical problem of the relatively large fluctuations in the PSNR caused by encoding and decoding of the video by using the same resolution in the related art.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Figure 2:
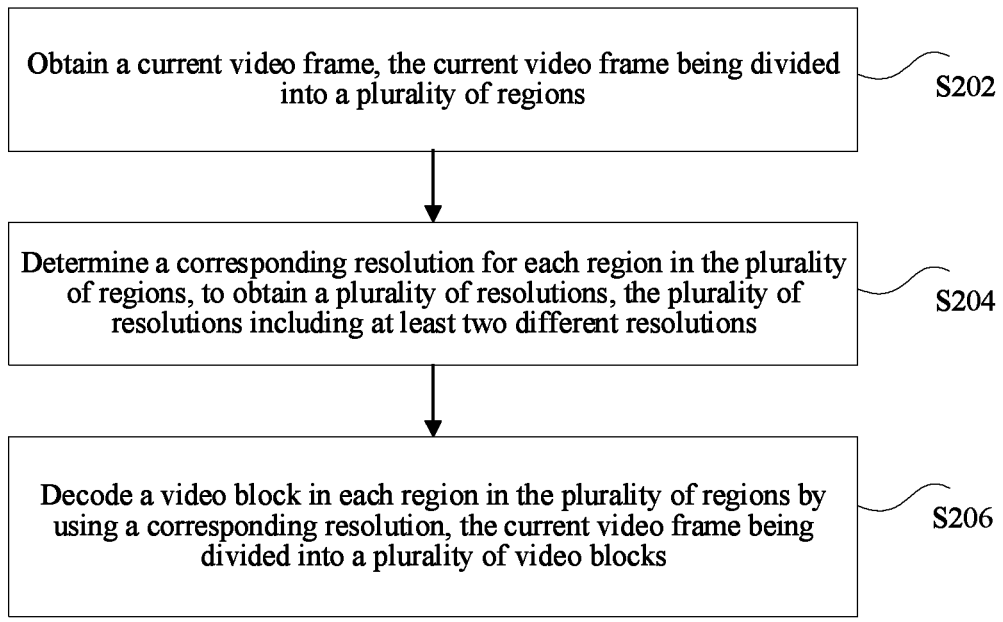
FIG. 2 is a schematic diagram of an exemplary video decoding method according to an embodiment of this application.

According to an aspect of the embodiments of this application, a video decoding method is provided. As shown in FIG. 2, the method includes the following steps:

S202: Obtain a current video frame, the current video frame being divided into a plurality of regions.

S204: Determine a corresponding resolution for each region in the plurality of regions, to obtain a plurality of resolutions, the plurality of resolutions including at least two different resolutions. In some embodiments, the plurality of resolutions are determined according to a transmission bandwidth of a video stream including the current video frame from a source (e.g., a video server 302) to a destination (e.g., a client terminal 304), e.g., by comparing the transmission bandwidth with a preset bandwidth threshold.

S206: Decode a video block in each region in the plurality of regions by using a corresponding resolution, the current video frame being divided into a plurality of video blocks.

Figure 3:
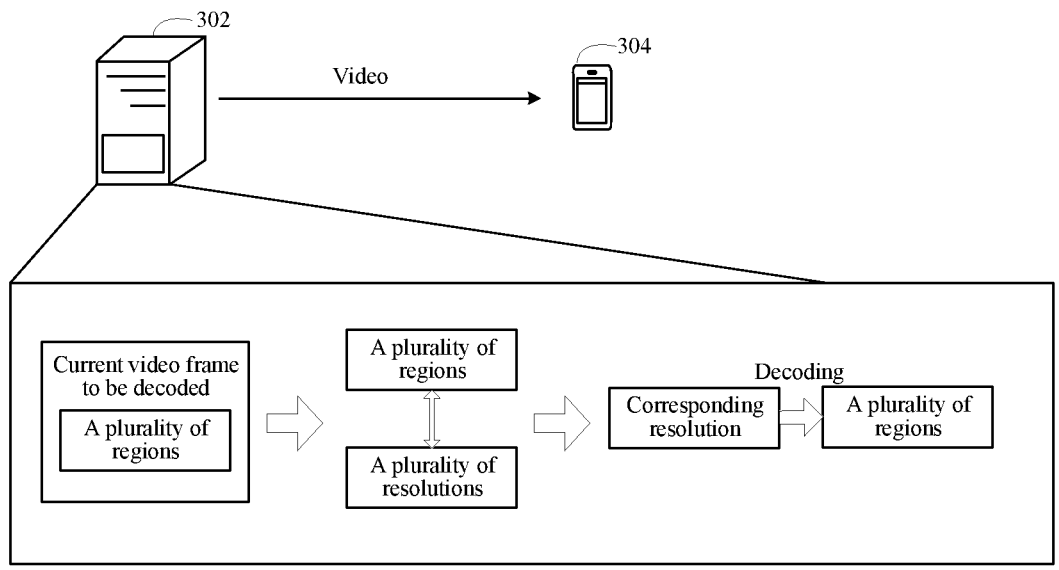
FIG. 3 is a schematic diagram of an application environment of an exemplary video decoding method according to an embodiment of this application.

In some embodiments, the foregoing video decoding method is applicable to a hardware environment formed by a server 302 and a client 304 shown in FIG. 3. As shown in FIG. 3, the server 302 obtains a current video frame, the current video frame being divided into a plurality of regions; determines a corresponding resolution for each region in the plurality of regions, to obtain a plurality of resolutions, the plurality of resolutions including at least two different resolutions; and decodes a video block in each region in the plurality of regions by using a corresponding resolution in the plurality of resolutions, the current video frame being divided into a plurality of video blocks. That is, a resolution used for decoding a video block in a region in the current video frame is the resolution that is determined in S204 and corresponds to the region.

The server 302 sends a decoded video to the client 304 for playing.

In some embodiments, the video decoding method is applicable to, but is not limited to, a scenario of audio and video processing. For example, when a client A and a client B make a video call, the client A and the client B acquire video pictures respectively, encode the acquired video pictures, and send encoded videos to each other. The client A and the client B decode the received videos and play the decoded videos.

In some embodiments, the video decoding method is further applicable to, but is not limited to scenarios such as playing of a video file and video live streaming.

The foregoing client may be, but is not limited to, various applications, for example, an on-line education application, an instant messaging application, a community space application, a game application, a shopping application, a browser application, a financial application, a multimedia application, and a live broadcast application. Specifically, the video decoding method is applicable to, but is not limited to, a scenario of audio and video processing in the instant messaging application, or is applicable to, but is not limited to, a scenario of audio and video processing in the multimedia application, to avoid relatively large fluctuations in a PSNR during encoding and decoding of a video. The foregoing description is merely an example, and is not limited in this embodiment.

In some embodiments, the plurality of regions included in the current video frame are decoded by using at least two different resolutions.

In some embodiments, the current video frame is divided into a plurality of video blocks, and the plurality of divided regions may correspond to the plurality of video blocks or may not correspond to the plurality of video blocks. A resolution used for decoding may be determined according to a divided region, a video frame is decoded according to a divided video block, and the resolution used for decoding is a resolution corresponding to a region in which the video block falls.

Figure 4:
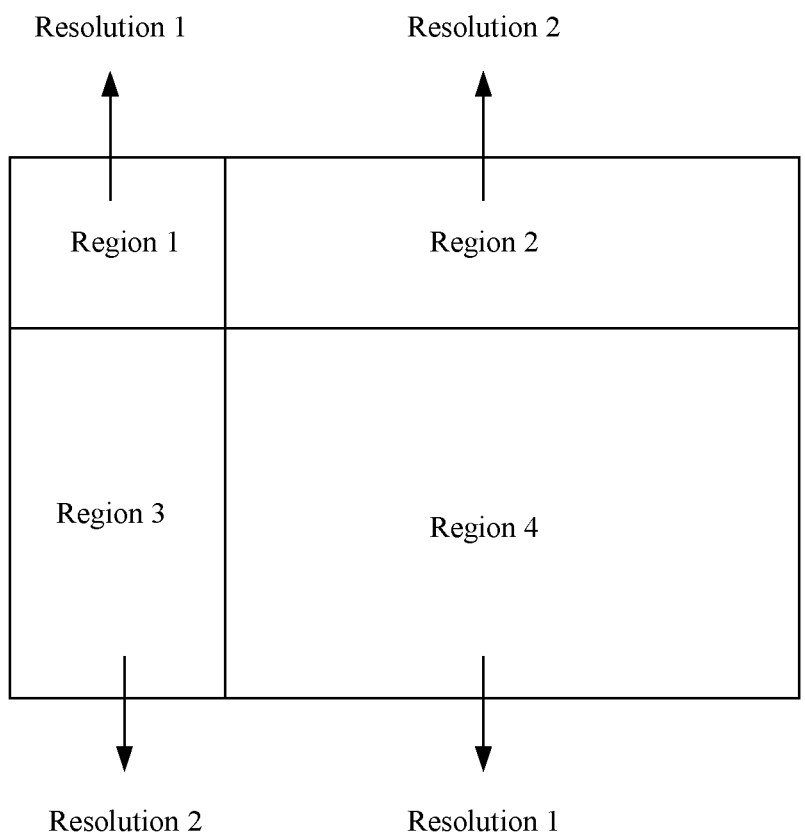
FIG. 4 is a schematic diagram 1 of an exemplary video decoding method according to an embodiment of this application.

In an implementation, as shown in FIG. 4, a current video frame is obtained, the current video frame being divided into a plurality of regions, including: a region 1, a region 2, a region 3, and a region 4. It may be determined that a resolution corresponding to the region 1 is a resolution 1, a resolution corresponding to the region 2 is a resolution 2, a resolution corresponding to the region 3 is the resolution 2, and a resolution corresponding to the region 4 is the resolution 1. The region 1 is decoded by using the resolution 1, the region 2 is decoded by using the resolution 2, the region 3 is decoded by using the resolution 2, and the region 4 is decoded by using the resolution 1.

It may be seen that through the foregoing steps, for one video frame in a video, different video blocks in the video frame may be adaptively decoded by using a corresponding resolution. In this way, regardless of whether transmission bandwidth is relatively small or is relatively large, a corresponding PSNR is relatively large, and distortion is relatively small, thereby ensuring that the PSNR can change within a relatively small range, and the PSNR is relatively large, thereby achieving the technical effect of avoiding relatively large fluctuations in the PSNR during encoding and decoding of a video, to resolve the technical problem of the relatively large fluctuations in the PSNR caused by encoding and decoding of the video by using the same resolution in the related art.

As an exemplary solution, the current video frame being divided into a plurality of regions includes:
  S1: the plurality of regions are the plurality of video blocks obtained by dividing the current video frame based on a predetermined video encoding and decoding standard; or
  S2: the plurality of regions are obtained by dividing the current video frame in response to a region division instruction.

Figure 5:
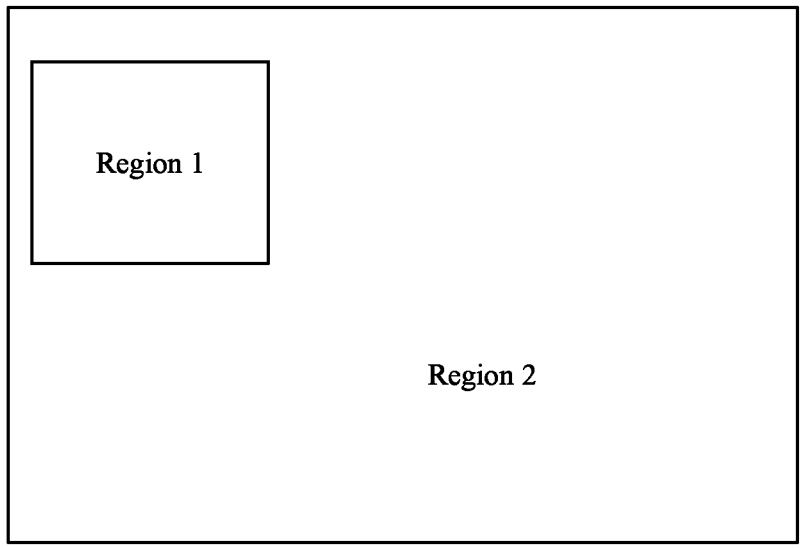
FIG. 5 is a schematic diagram 2 of an exemplary video decoding method according to an embodiment of this application.

In some embodiments, the plurality of regions may be obtained in, but is not limited to, division manners. For example, a division manner such as a binary-tree, a ternary-tree, or a quadtree of video blocks in a standard protocol is used, each video block being a region, or a division manner of regions may be indicated by using an inputted region division instruction. For example, as shown in FIG. 5, a relatively small video window in a video calling process is classified as a region for use as the region 1, and a relatively large video window or a part other than the relatively small video window is classified as a region for use as the region 2.

As an exemplary solution, the determining a corresponding resolution for each region in the plurality of regions includes the following step:
  S1: Determine completely different resolutions for different regions in the plurality of regions.

In some embodiments, resolutions determined for different regions in the plurality of regions are not identical. In other words, the resolutions determined for the different regions in the plurality of regions may be totally different, that is, each region corresponds to a resolution, and resolutions of regions are different. Alternatively, there may be a case that different regions correspond to the same resolution, but resolutions of a plurality of regions are nonidentical. For example, resolutions of regions in the plurality of regions may be selected from a resolution set, and different resolutions or nonidentical resolutions may be selected for the regions from the resolution set.

As an exemplary solution, the determining a corresponding resolution for each region in the plurality of regions includes the following steps:
  S1: Obtain a syntax element from the current video frame.
  S2: Determine resolutions respectively corresponding to the plurality of regions according to flag bit data obtained from the syntax element, the flag bit data being used for identifying a correspondence between the plurality of regions and the plurality of resolutions.

In some embodiments, a resolution corresponding to each region may be added to a syntax element by, but is not limited to, an encoder side and transmitted to a decoder side. A correspondence between a region and a resolution is indicated by using flag bit data in the syntax element, so that the decoder side decodes a region by using a resolution corresponding to the region.

In some embodiments, the syntax element used for indicating a resolution used for decoding each region may be a segment of data located at a fixed position of the current video frame, and different data values at the position represent different resolutions. A syntax element representing a resolution corresponding to a region may be added to the position.

In some embodiments, during reconstruction of a video, at least one pair of decoding regions to be reconstructed are determined from a current video frame, each pair of decoding regions in the at least one pair of decoding regions including a first decoding region using a resolution A and a second decoding region using a resolution B, the first decoding region and the second decoding region being adjacent decoding regions.

The resolution A of the first decoding region is adjusted to a target resolution, and the resolution B of the second decoding region is adjusted to the target resolution.

A first edge pixel set is determined from the first decoding region, and a second edge pixel set is determined from the second decoding region, a position of the first edge pixel set being adjacent to a position of the second edge pixel set.

The first edge pixel set is filtered, to obtain a filtered first edge pixel set, and the second edge pixel set is filtered, to obtain a filtered second edge pixel set, the filtered first edge pixel set matching the filtered second edge pixel set.

A first difference between a pixel value of an $i^{th}$ pixel in the filtered first edge pixel set and a pixel value of a $i^{th}$ pixel that corresponds to the $i^{th}$ pixel and is in the filtered second edge pixel set is less than a second difference between a pixel value of an $i^{th}$ pixel in the first edge pixel set and a pixel value of a $j^{th}$ pixel in the second edge pixel set, i being a positive integer and being less than or equal to a total quantity of pixels in the first edge pixel set, j being a positive integer and being less than or equal to a total quantity of pixels in the second edge pixel set.

The adjustment to the target resolution includes:
(1) adjusting the resolution B to the resolution A when the target resolution is equal to the resolution A;
(2) adjusting the resolution A to the resolution B when the target resolution is equal to the resolution B; and
(3) when the target resolution is equal to a resolution C, adjusting the resolution A to the resolution C, and adjusting the resolution B to the resolution C, the resolution C being different from the resolution A and being different from the resolution B.

Edge filtering can be performed only after the resolution is unified. The resolutions of the decoding regions are adjusted, and edge filtering is performed on the edge pixel sets determined from the decoding regions, so that an obvious seam in a video may be avoided during reconstruction, thereby ensuring accurate restoration of content in the video and further resolving the technical problem of video distortion caused by inconsistent resolutions.

Figure 6:
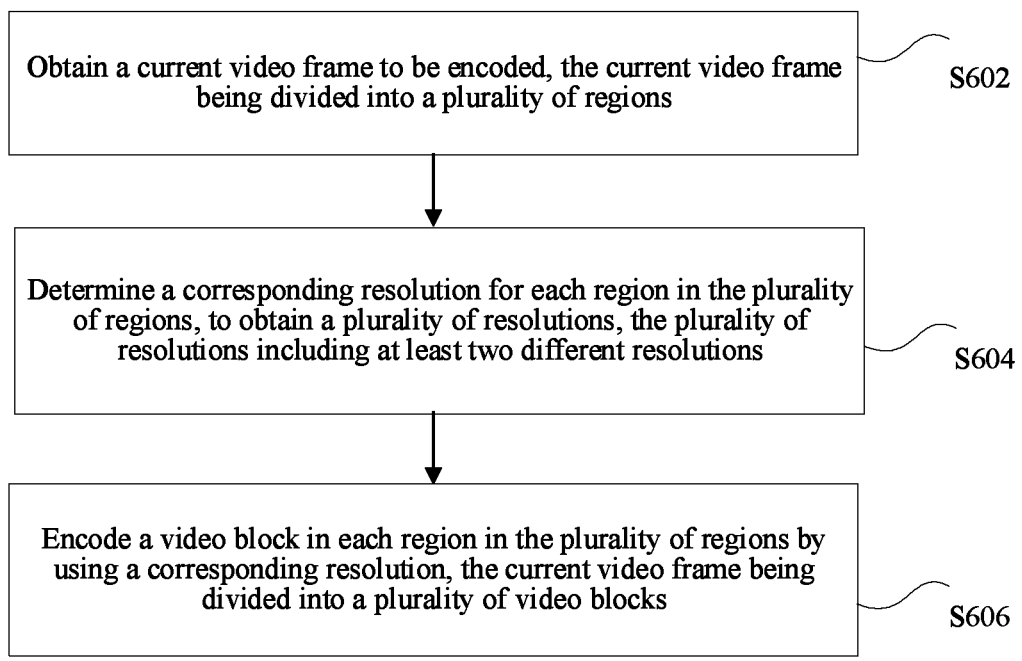
FIG. 6 is a schematic diagram of an exemplary video decoding method according to an embodiment of this application.

According to another aspect of the embodiments of this application, a video encoding method is provided. As shown in FIG. 6, the method includes the following steps:
S602. Obtain a current video frame, the current video frame being divided into a plurality of regions.
S604: Determine a corresponding resolution for each region in the plurality of regions, to obtain a plurality of resolutions, the plurality of resolutions including at least two different resolutions. In some embodiments, the plurality of resolutions are determined according to a transmission bandwidth of a video stream including the current video frame from a source (e.g., a client terminal 704) to a destination (e.g., a video server 702), e.g., by comparing the transmission bandwidth with a preset bandwidth threshold.
S606: Encode a video block in each region in the plurality of regions by using a corresponding resolution, the current video frame being divided into a plurality of video blocks.

Figure 7:
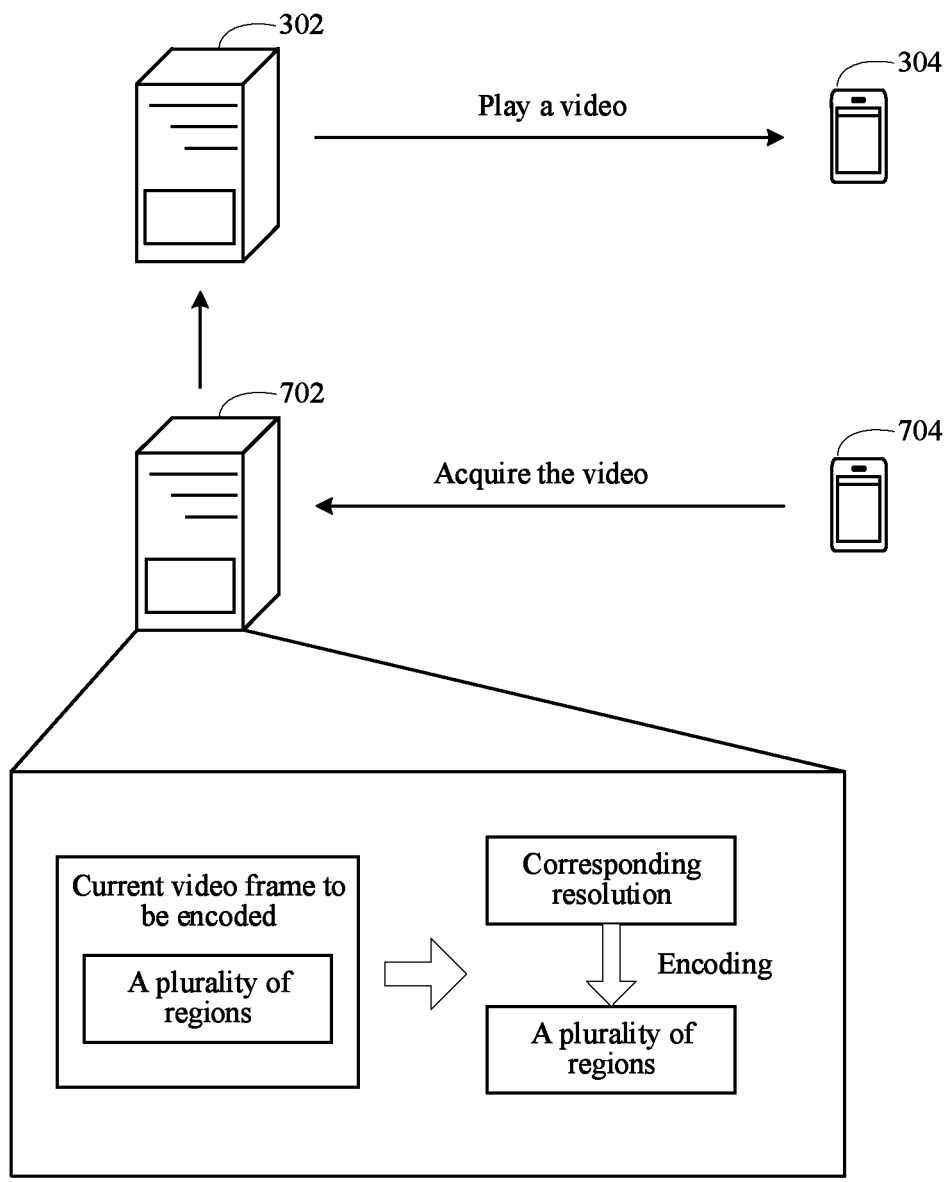
FIG. 7 is a schematic diagram of an application environment of an exemplary video decoding method according to an embodiment of this application.

In some embodiments, the video encoding method is applicable to a hardware environment formed by a server 702, a server 302, a client 704, and a client 304 shown in FIG. 7. As shown in FIG. 7, the server 702 obtains a current video frame acquired by the client 704, the current video frame being divided into a plurality of regions; determines a corresponding resolution for each region in the plurality of regions, to obtain a plurality of resolutions, the plurality of resolutions including at least two different resolutions; and encodes a video block in each region in the plurality of regions by using a corresponding resolution in the plurality of resolutions, the current video frame being divided into a plurality of video blocks. The server 702 sends an encoded video to the server 302 for decoding. That is, a resolution used for encoding a video block in a region in the current video frame is the resolution that is determined in S604 and corresponds to the region.

The server 302 sends a decoded video to the client 304 for playing.

In some embodiments, the video encoding method is applicable to, but is not limited to, a scenario of audio and video processing. For example, when a client A and a client B make a video call, the client A and the client B acquire video pictures respectively, encode the acquired video pictures, and send encoded videos to each other. The client A and the client B decode the received videos and play the decoded videos.

In some embodiments, the video encoding method is further applicable to, but is not limited to scenarios such as playing of a video file and video live streaming.

The foregoing client may be, but is not limited to, various applications, for example, an on-line education application, an instant messaging application, a community space application, a game application, a shopping application, a browser application, a financial application, a multimedia application, and a live broadcast application. Specifically, the video encoding method is applicable to, but is not limited to, a scenario of audio and video processing in the instant messaging application, or is applicable to, but is not limited to, a scenario of audio and video processing in the multimedia application, to avoid relatively large fluctuations in a PSNR during encoding and decoding of a video. The foregoing description is merely an example, and is not limited in this embodiment.

In some embodiments, different regions in the current video frame are encoded by using different resolutions. For example, the current video frame is divided into four regions, which are respectively a region 1, a region 2, a region 3, and a region 4. It is determined that a resolution 1 corresponds to the region 1, a resolution 2 corresponds to the region 2 and the region 3, and a resolution 3 corresponds to the region 4. The region 1 is encoded by using the resolution 1, the region 2 and the region 3 are encoded by using the resolution 2, and the region 4 is encoded by using the resolution 3.

In some embodiments, the plurality of regions included in the current video frame are encoded by using at least two different resolutions.

In some embodiments, the current video frame is divided into a plurality of video blocks, and the plurality of divided regions may correspond to the plurality of video blocks or may not correspond to the plurality of video blocks. A resolution used for encoding may be determined according to a divided region, a video frame is encoded according to a divided video block, and the resolution used for encoding is a resolution corresponding to a region in which the video block falls.

It may be seen that through the foregoing steps, for one video frame in a video, different video blocks in the video frame may be adaptively encoded by using a corresponding resolution. In this way, regardless of whether transmission bandwidth is relatively small or is relatively large, a corresponding PSNR is relatively large, and distortion is relatively small, thereby ensuring that the PSNR can change within a relatively small range, and the PSNR is relatively large, thereby achieving the technical effect of avoiding relatively large fluctuations in the PSNR during encoding and decoding of a video, to resolve the technical problem of the relatively large fluctuations in the PSNR caused by encoding and decoding of the video by using the same resolution in the related art.

As an exemplary solution, before the determining a corresponding resolution for each region in the plurality of regions, the method further includes:
S1: dividing the current video frame into the plurality of video blocks based on a predetermined video encoding and decoding standard, and using the plurality of video blocks as the plurality of regions; or
S2: obtaining an inputted region division instruction, and dividing the current video frame into the plurality of regions in response to the region division instruction.

In some embodiments, the plurality of regions may be obtained in, but is not limited to, division manners. For example, a division manner such as a binary-tree, a ternary-tree, or a quadtree of video blocks in a standard protocol is used, each video block being a region, or a division manner of regions may be indicated by using an inputted region division instruction.

In an implementation, when the inputted region division instruction is obtained and the current video frame is divided into the plurality of regions in response to the region division instruction, the determining a corresponding resolution for each region in the plurality of regions includes the following steps:

S1: Obtain an inputted resolution determining instruction, the resolution determining instruction being used for indicating a resolution corresponding to each region.

S2: Determine the corresponding resolution for each region according to the resolution indicated by the resolution determining instruction.

In some embodiments, a resolution corresponding to each region may be indicated by a resolution determining instruction. The resolution indicated by the resolution determining instruction may be determined according to a preset rule (for example, determined according to information such as a position or a feature of a region).

As an exemplary solution, the determining a corresponding resolution for each region in the plurality of regions includes the following steps:

S1: Determine completely different resolutions for different regions in the plurality of regions.

In some embodiments, resolutions determined for different regions in the plurality of regions are not identical. In other words, the resolutions determined for the different regions in the plurality of regions may be totally different, that is, each region corresponds to a resolution, and resolutions of regions are different. Alternatively, there may be a case that different regions correspond to the same resolution, but resolutions of a plurality of regions are nonidentical. For example, resolutions of regions in the plurality of regions may be selected from a resolution set, and different resolutions or nonidentical resolutions may be selected for the regions from the resolution set.

As an exemplary solution, the encoding a video block in each region in the plurality of regions by using a corresponding resolution includes the following steps:

S1: Encode the video block in each region in the plurality of regions by using the corresponding resolution, to obtain encoded data.

S2: Determine flag bit data corresponding to the encoded data, the flag bit data being used for identifying a correspondence between the plurality of regions and the plurality of resolutions.

S3: Add the flag bit data as a syntax element to the encoded data, to obtain an encoded video frame.

In some embodiments, a resolution used for encoding each region may be indicated in a manner of adding flag bit data. For example, the current video frame is divided into four regions, which are respectively a region 1, a region 2, a region 3, and a region 4. The region 1 is encoded by using a resolution 1, and a syntax element used for representing the resolution 1 is added to the region 1. The region 2 and the region 3 are encoded by using a resolution 2, and syntax elements used for representing the resolution 2 are respectively added to the region 2 and the region 3. The region 4 is encoded by using a resolution 3, and a syntax element used for representing the resolution 3 is added to the region 4.

In some embodiments, the syntax element used for indicating a resolution used for encoding each region may be a segment of data located at a fixed position of the current video frame, and different data values at the position represent different resolutions. A syntax element representing a resolution corresponding to a region may be added to the position.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 8:
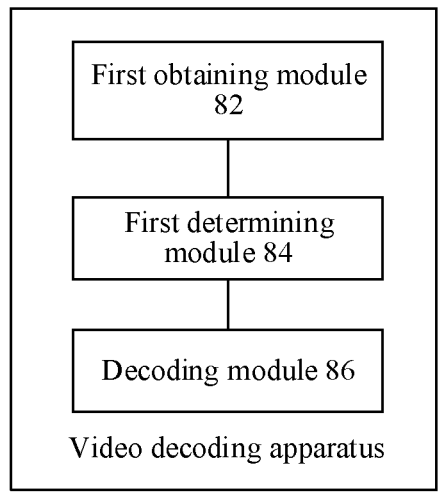
FIG. 8 is a schematic diagram of an exemplary video decoding apparatus according to an embodiment of this application.

According to another aspect of the embodiments of this application, a video decoding apparatus for implementing the video decoding method is further provided. As shown in FIG. 8, the apparatus includes:

a first obtaining module 82, configured to obtain a current video frame, the current video frame being divided into a plurality of regions;

a first determining module 84, configured to determine a corresponding resolution for each region in the plurality of regions, to obtain a plurality of resolutions, the plurality of resolutions including at least two different resolutions; and a decoding module 86, configured to decode a video block in each region in the plurality of regions by using a corresponding resolution, the current video frame being divided into a plurality of video blocks.

Optionally, the plurality of regions are the plurality of video blocks obtained by dividing the current video frame based on a predetermined video encoding and decoding standard; or the plurality of regions are obtained by dividing the current video frame in response to a region division instruction.

Optionally, the first determining module includes:

a first determining unit, configured to determine completely different resolutions for different regions in the plurality of regions.

Optionally, the first determining module includes:

a second determining unit, configured to obtain a syntax element from the current video frame; and a first obtaining unit, configured to determine resolutions respectively corresponding to the plurality of regions according to flag bit data obtained from the syntax element, the flag bit data being used for identifying a correspondence between the plurality of regions and the plurality of resolutions.

Figure 9:
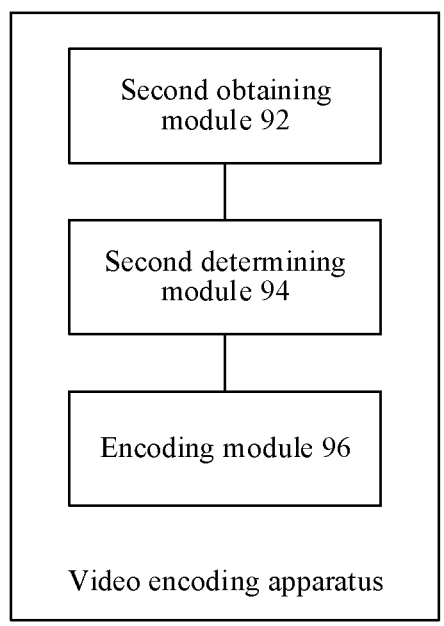
FIG. 9 is a schematic diagram of an exemplary video encoding apparatus according to an embodiment of this application.

According to another aspect of the embodiments of this application, a video encoding apparatus for implementing the video encoding method is further provided. As shown in FIG. 9, the apparatus includes:

a second obtaining module 92, configured to obtain a current video frame, the current video frame being divided into a plurality of regions;

a second determining module 94, configured to determine a corresponding resolution for each region in the plurality of regions, to obtain a plurality of resolutions, the plurality of resolutions including at least two different resolutions; and an encoding module 96, configured to encode a video block in each region in the plurality of regions by using a corresponding resolution, the current video frame being divided into a plurality of video blocks.

In some embodiments, the apparatus further includes:

a division unit, configured to: divide, before the corresponding resolution is determined for each region in the plurality of regions, the current video frame into the plurality of video blocks based on a predetermined video encoding and decoding standard, and use the plurality of video blocks as the plurality of regions; or a second obtaining unit, configured to: obtain an inputted region division instruction, and divide the current video frame into the plurality of regions in response to the region division instruction.

In some embodiments, the second determining module includes:

a third obtaining unit, configured to obtain an inputted resolution determining instruction, the resolution determining instruction being used for indicating a resolution corresponding to each region; and a third determining unit, configured to determine the corresponding resolution for each region according to the resolution indicated by the resolution determining instruction.

In some embodiments, the second determining module includes:

a fourth determining unit, configured to determine completely different resolutions for different regions in the plurality of regions.

In some embodiments, the encoding module includes:

an encoding unit, configured to encode the video block in each region in the plurality of regions by using the corresponding resolution, to obtain encoded data;

a fifth determining unit, configured to determine flag bit data corresponding to the encoded data, the flag bit data being used for identifying a correspondence between the plurality of regions and the plurality of resolutions; and an adding unit, configured to add the flag bit data as a syntax element to the encoded data, to obtain an encoded video frame.

For an application environment in this embodiment of this application, reference may be made to, but not limited to the application environment of the foregoing embodiments. The details are not described again in this embodiment. This embodiment of this application provides a specific application example for implementing the foregoing video encoding method and video decoding method. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 10:
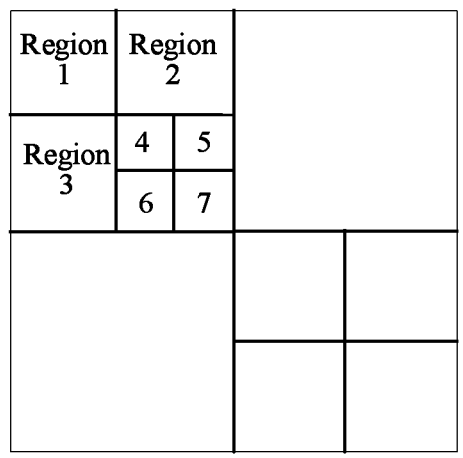
FIG. 10 is a schematic diagram 1 of an application scenario of an exemplary video encoding method and video decoding method according to an embodiment of this application.

In some embodiments, the video decoding method and the video encoding method are applicable to, but are not limited to, a scenario of encoding and decoding a video shown in FIG. 10. In a video encoding process in the scenario, different blocks in a frame of a video are encoded by using different resolutions. Specifically, corresponding resolutions are respectively selected for encoding different regions divided based on a video encoding and decoding standard or an artificial rule in the frame.

For a tth to-be-encoded frame in the video, a region in the tth frame is divided into different regions based on the video encoding and decoding standard or the artificial rule, as shown in FIG. 10, a region 1 to a region 7. A division manner in FIG. 10 is merely an example, and a quantity and shapes of divided regions in a frame are not limited in this embodiment of this application.

Subsequently, different regions are respectively encoded by using different resolutions. For example, for the region 1, it is determined that a block in the region 1 is encoded by using a resolution 2 from a resolution 1, the resolution 2, and a resolution 3 in the resolution set.

Figure 11:
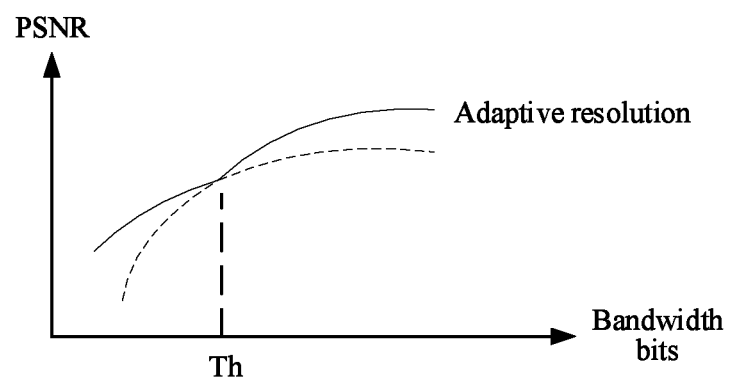
FIG. 11 is a schematic diagram of an application scenario of an exemplary video encoding method and video decoding method according to an embodiment of this application.

As shown in FIG. 11, in a video encoding process of this application, different blocks in a frame in a video are adaptively encoded by using corresponding resolutions. In this way, regardless of whether transmission bandwidth is relatively small (for example, less than a bandwidth threshold Th shown in FIG. 11) or is relatively large (for example, greater than the bandwidth threshold Th shown in FIG. 11), a corresponding PSNR is relatively large, and distortion is relatively small.

Figure 1:
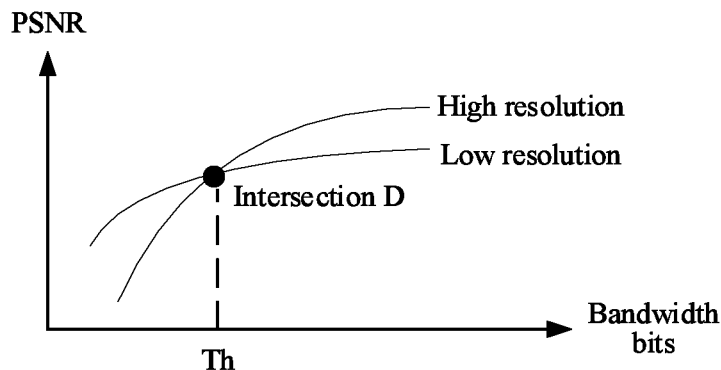
FIG. 1 is a schematic diagram of a PSNR of encoding and decoding manners in the related art.

In addition, the different blocks in the frame in the video are adaptively encoded by using the corresponding resolutions, so that it is not necessary that a corresponding resolution is selected according to an intersection (for example, an intersection in FIG. 1) corresponding to different types of videos or different frames of the same video or different blocks in the same frame when frames in the video are encoded, thereby reducing the complexity of encoding.

Figure 12:
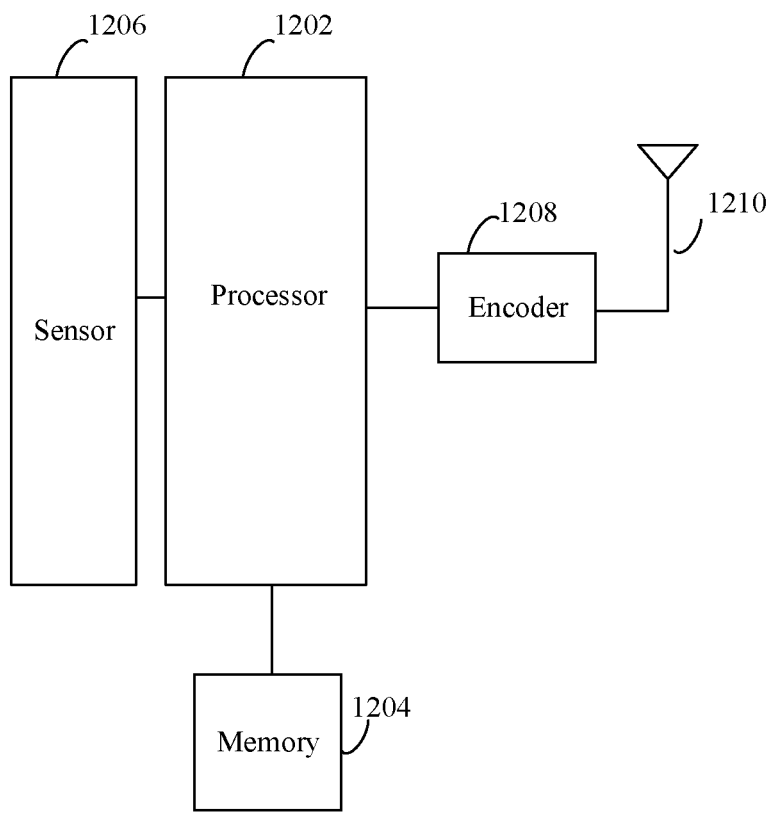
FIG. 12 is a schematic diagram of an electronic device according to an embodiment of this application.

According to still another aspect of the embodiments of this application, an electronic device configured to implement the video encoding method or the video decoding method is further provided. As shown in FIG. 12, the electronic device includes: one or more (only one is shown in the figure) processors 1202, a memory 1204, a sensor 1206, an encoder 1208, and a transmission apparatus 1210. The memory stores a computer program, and the processor is configured to perform the steps in any one of the foregoing method embodiments through the computer program.

In some embodiments, the electronic device may be located in at least one of a plurality of network devices in a computer network.

In some embodiments, the processor may be configured to perform the following steps by executing the computer program.

S1: Obtain a current video frame, the current video frame being divided into a plurality of regions.

S2: Determine a corresponding resolution for each region in the plurality of regions, to obtain a plurality of resolutions, the plurality of resolutions including at least two different resolutions.

S3: Decode a video block on each region in the plurality of regions by using a corresponding resolution, the current video frame being divided into a plurality of video blocks.

In some embodiments, a person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, a mobile internet device (MID), or a PAD. FIG. 12 does not limit the structure of the electronic device. For example, the electronic device may alternatively include more or fewer components (such as a network interface and a display device) than those shown in FIG. 12, or has a configuration different from that shown in FIG. 12.

The memory 1204 may be configured to store a software program and a module, for example, program instructions/modules corresponding to the video decoding method and apparatus in the embodiments of this application. The processor 1202 runs the software program and module stored in the memory 1204, to implement various functional applications and data processing, that is, implement the video encoding method or the video decoding method. The memory 1204 may include a high-speed random access memory, and may also include a non-volatile memory, for example, one or more magnetic storage apparatuses, a flash memory, or another non-volatile solid-state memory. In some embodiments, the memory 1204 may further include memories remotely disposed relative to the processor 1202, and the remote memories may be connected to a terminal through a network. Examples of the network include, but are not limited to, the Internet, an intranet, a local area network, a mobile communication network, and a combination thereof.

The transmission apparatus 1210 is configured to receive or transmit data through a network. Specific examples of the foregoing network may include a wired network and a wireless network. In an example, the transmission apparatus 1210 includes a network interface controller (NIC). The NIC may be connected to another network device and a router by using a network cable, so as to communicate with the Internet or a local area network. In an example, the transmission apparatus 1210 is a radio frequency (RF) module, which communicates with the Internet in a wireless manner.

Specifically, the memory 1204 is configured to store an application program.

An embodiment of this application further provides a storage medium, storing a computer program, the computer program being configured to perform steps in any one of the foregoing method embodiments when being run.

In some embodiments, the storage medium may be configured to store a computer program configured to perform the following steps:

S1: Obtain a current video frame, the current video frame being divided into a plurality of regions.

S2: Determine a corresponding resolution for each region in the plurality of regions, to obtain a plurality of resolutions, the plurality of resolutions including at least two different resolutions.

S3: Decode a video block on each region in the plurality of regions by using a corresponding resolution, the current video frame being divided into a plurality of video blocks.

In addition, an embodiment of this application further provides a storage medium, the storage medium being configured to store a computer program, the computer program being configured to perform the video encoding method or the video decoding method in the foregoing embodiments.

In addition, an embodiment of this application further provides a computer program product including instructions, the instructions, when run on a computer, causing the computer to perform the video encoding method or the video decoding method provided in the foregoing embodiments.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A video decoding method performed by an electronic device, the method comprising:
   obtaining a current video frame to be decoded, the current video frame being divided into a plurality of regions;
   determining a corresponding image resolution for each region in the plurality of regions, to obtain a plurality of image resolutions, the plurality of image resolutions comprising at least two different image resolutions, the determining including:

obtaining, for the current video frame, a syntax element indicating respective image resolutions for the plurality of regions; and
determining, from flag bit data of the syntax element, a correspondence between each region of the plurality of regions and a corresponding image resolution; and
decoding each region of the plurality of regions of the current video frame by using the corresponding image resolution for each region, further including:
decoding a first region of the plurality of regions of the current video frame by using a first image resolution when a transmission bandwidth of the first region from a source to the electronic device is less than a bandwidth threshold; and
decoding a second region of the plurality of regions of the current video frame by using a second image resolution when the transmission bandwidth of the second region from the source to the electronic device is greater than the bandwidth threshold, wherein the second image resolution is higher than the first image resolution.

2. The method according to claim 1, wherein the plurality of regions are obtained by dividing the current video frame based on a predetermined video encoding and decoding standard; or
the plurality of regions are obtained by dividing the current video frame in response to a region division instruction.

3. The method according to claim 1, wherein the determining a corresponding image resolution for each region in the plurality of regions comprises:
determining a different image resolution for each region in the plurality of regions.

4. A video encoding method performed by an electronic device, the method comprising:
obtaining a current video frame, the current video frame being divided into a plurality of regions;
determining a corresponding image resolution for each region in the plurality of regions, to obtain a plurality of image resolutions, the plurality of image resolutions comprising at least two different image resolutions, further including:
determining a first image resolution for a first region of the plurality of regions of the current video frame when a transmission bandwidth of the first region from the electronic device to a destination is less than a bandwidth threshold; and
determining a second image resolution for a second region of the plurality of regions of the current video frame when the transmission bandwidth of the first region from the electronic device to the destination is greater than the bandwidth threshold, wherein the second image resolution is higher than the first image resolution;
generating encoded data by encoding each region in the plurality of regions of the current video frame using a corresponding image resolution for each region to obtain encoded data, including:
determining flag bit data identifying a correspondence between each region of the plurality of regions and a corresponding image resolution; and
determining a syntax element from the flag bit data, the syntax element indicating respective image resolutions for the plurality of regions; and
adding the syntax element to the encoded data to obtain an encoded video frame.

5. The method according to claim 4, further comprising, before determining the corresponding image resolution for each region in the plurality of regions,
obtaining an inputted region division instruction, and dividing the current video frame into the plurality of regions in response to the inputted region division instruction.

6. The method according to claim 5, wherein determining a corresponding image resolution for each region in the plurality of regions comprises:
obtaining an inputted resolution determining instruction, the inputted resolution determining instruction being used for indicating an image resolution corresponding to each region; and
determining the corresponding resolution for each region according to the image resolution indicated by the inputted resolution determining instruction.

7. An electronic device, comprising a memory and a processor, the memory storing computer-readable instructions, and the computer-readable instructions, when executed by the processor, cause the electronic device to perform a plurality of operations including:
obtaining a current video frame to be decoded, the current video frame being divided into a plurality of regions;
determining a corresponding image resolution for each region in the plurality of regions, to obtain a plurality of image resolutions, the plurality of image resolutions comprising at least two different image resolutions, the determining including:
obtaining, for the current video frame, a syntax element indicating respective image resolutions for the plurality of regions; and
determining, from flag bit data of the syntax element, a correspondence between each region of the plurality of regions and a corresponding image resolution; and
decoding each region of the plurality of regions of the current video frame by using the corresponding image resolution for each region, further including:
decoding a first region of the plurality of regions of the current video frame by using a first image resolution when a transmission bandwidth of the first region from a source to the electronic device is less than a bandwidth threshold; and
decoding a second region of the plurality of regions of the current video frame by using a second image resolution when the transmission bandwidth of the second region from the source to the electronic device is greater than the bandwidth threshold, wherein the second image resolution is higher than the first image resolution.

8. The electronic device according to claim 7, wherein the plurality of regions are obtained by dividing the current video frame based on a predetermined video encoding and decoding standard; or
the plurality of regions are obtained by dividing the current video frame in response to a region division instruction.

9. The electronic device according to claim 7, wherein the plurality of operations further comprise:
obtaining a second current video frame, the second current video frame being divided into a plurality of first regions;
determining a corresponding image resolution for each first region in the plurality of first regions associated with the second current video frame, to obtain a plurality of image resolutions for the second current video frame, the plurality of image resolutions for the second current video frame comprising at least two different resolutions, further including:
  determining a first image resolution for a first region of the plurality of regions of the current video frame when a transmission bandwidth of the first region from the electronic device to a destination is less than a bandwidth threshold; and
  determining a second image resolution for a second region of the plurality of regions of the current video frame when the transmission bandwidth of the first region from the electronic device to the destination is greater than the bandwidth threshold, wherein the second image resolution is higher than the first image resolution; and
encoding each first region in the plurality of first regions of the second current video frame by using a corresponding image resolution of the plurality of image resolutions for the second current video frame.

10. The electronic device according to claim 9, wherein the plurality of operations further comprise:
  before determining the corresponding image resolution for each first region in the plurality of first regions,
  obtaining an inputted region division instruction, and dividing the second current video frame into the plurality of first regions in response to the inputted region division instruction.

11. The electronic device according to claim 10, wherein the determining a corresponding image resolution for each first region in the plurality of first regions comprises:
  obtaining an inputted resolution determining instruction, the inputted resolution determining instruction being used for indicating an image resolution corresponding to each first region; and
  determining the corresponding image resolution for each first region according to the image resolution indicated by the inputted resolution determining instruction.

12. The electronic device according to claim 9, wherein the determining a corresponding image resolution for each first region in the plurality of first regions comprises:
  determining a different image resolution for each first region in the plurality of first regions.

13. The electronic device according to claim 9, wherein the encoding a video block in each region in the plurality of regions by using a corresponding resolution comprises:
  encoding each first region in the plurality of first regions of the second current video frame by using the corresponding resolution, to obtain first encoded data;
  determining first flag bit data corresponding to the first encoded data, the first flag bit data being used for identifying a correspondence between the plurality of first regions and the plurality of image resolutions; and
  adding the first flag bit data as a first syntax element to the first encoded data, to obtain a first encoded video frame.

\* \* \* \* \*